United States Patent [19]

Yabe et al.

[11] Patent Number: 4,818,184

[45] Date of Patent: Apr. 4, 1989

[54] DEVICE FOR GENERATING JET WITH ELECTRIC FIELD

[75] Inventors: Akira Yabe; Takao Taketani, both of Ibaraki, Japan

[73] Assignees: Agency of Industrial Science & Technology; Ministry of International Trade & Industry, both of Tokyo, Japan

[21] Appl. No.: 31,371

[22] Filed: Mar. 30, 1987

[30] Foreign Application Priority Data

Mar. 31, 1986 [JP] Japan .................................. 61-73149

[51] Int. Cl.⁴ ............................................. F04B 37/02
[52] U.S. Cl. ..................................................... 417/48
[58] Field of Search .................... 417/50, 48; 266/264; 310/11

[56] References Cited

U.S. PATENT DOCUMENTS

| | | | |
|---|---|---|---|
| 2,541,841 | 2/1951 | Tama | 417/50 X |
| 3,413,113 | 11/1968 | Vogels et al. | 266/234 X |
| 3,913,045 | 10/1975 | Von Starck | 417/50 X |
| 3,989,968 | 11/1976 | Hatch | 417/50 X |
| 4,316,233 | 2/1982 | Chato et al. | 417/48 |
| 4,412,785 | 11/1983 | Roman | 417/50 |
| 4,668,170 | 5/1987 | Barzartry et al. | 417/50 |
| 4,688,996 | 8/1987 | Alexion | 417/50 |

FOREIGN PATENT DOCUMENTS

| | | | |
|---|---|---|---|
| 809704 | 10/1960 | Canada | 417/50 |
| 59-66342 | 4/1984 | Japan . | |
| 353121 | 10/1972 | U.S.S.R. | 266/234 |

Primary Examiner—Donald E. Stout
Attorney, Agent, or Firm—Oblon, Fisher, Spivak, McClelland & Maier

[57] ABSTRACT

A device for generating jets in which two electrodes are disposed in a liquid. One of the electrodes is a plane electrode and the other is disposed at a predetermined distance from the plane electrode and has a plurality of space areas. The space areas are alternately large and small. When a high voltage is applied between the two electrodes, jets are generated from the large space areas.

13 Claims, 6 Drawing Sheets

DEVICE FOR GENERATING JET WITH ELECTRIC FIELD

FIELD OF THE INVENTION AND RELATED ART STATEMENT

This invention relates to a device for generating a jet of a liquid by applying a voltage between electrodes and, more particularly, to the structure of the electrode used in such a jet generation device.

The present inventors earlier proposed a method of generating a jet stream of a liquid by utilizing a high voltage field set up in the liquid (Japanese Patent Application Disclosure Sho 59(1984)-66342).

This method will now be described with reference to FIG. 1. In liquid 1 a ring-like electrode 3 is provided such that it faces a plane electrode 2 at a predetermined distance therefrom. When a high voltage is applied between the two electrodes, electric field portions having high and low electric field intensities are produced around the wire constituting the ring-like electrode. Due to these electric field intensity variations, the liquid is caused to pass through the gap between the two electrodes from the outer side of the ring-like electrode, whereby a jet stream 4 is produced from a small area 5 surrounded by the wire. In this proposed method, however, the jet stream is produced in the small area 5 surrounded by the wire, so that not all of the liquid can be sufficiently circulated or agitated.

OBJECT AND SUMMARY OF THE INVENTION

An object of the invention is to provide a jet generation device, which permits an easy method of generating high flow rate jets over the entire surface of an electrode and has high heat transfer coefficients.

To attain the above object, in the jet generation device according to the present invention the electrode that is disposed in liquid and facing a plane electrode is formed such that it has a plurality of space areas such that adjacent space areas have different sizes.

With the electrode constructed such that it has a plurality of space areas such that adjacent ones thereof have different sizes, by applying a high voltage between that electrode (hereinafter referred to as a "perforate type electrode") and a plane electrode, the liquid is caused to flow through the small areas of the perforate type electrode into the space between the two electrodes and flows cut as jets through the large areas.

By using the perforate type electrode as one of the two electrodes, there are formed areas, through which the liquid is caused to flow into the space between the two electrodes, and areas through which the liquid is caused to flow out as jets. Thus, it is possible to cause agitation or circulation of liquid efficiently without provision of any mechanically movable parts. For example, effective heat transfer with a heat transferring medium (liquid) can be obtained by cooling or heating the liquid from the side of the plane electrode.

The above and other objects and features of the invention will become more apparent from the following detailed description with reference to the accompanying drawings.

DETAILED DESCRIPTION OF THE PREFERRED EMBODIMENTS

Figure 1:
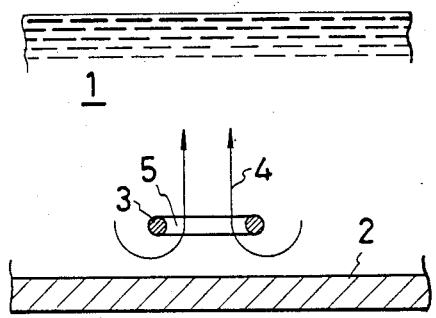
FIG. 1 is a schematic view showing a prior art jet generation device.
Figure 2:
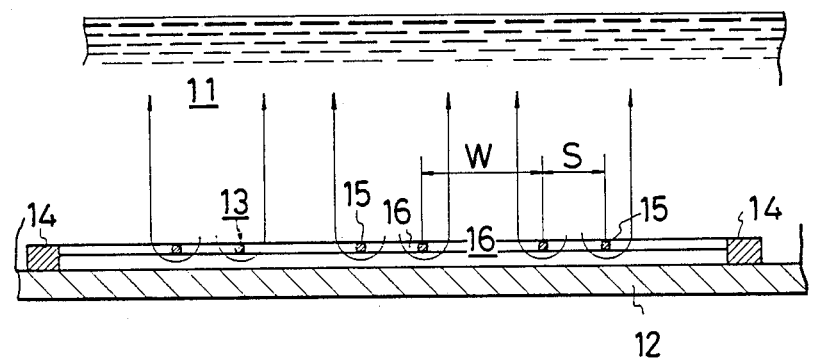
FIG. 2 is a schematic view showing a jet generation device incorporating one embodiment of the electrode according to the invention.
Figure 3:
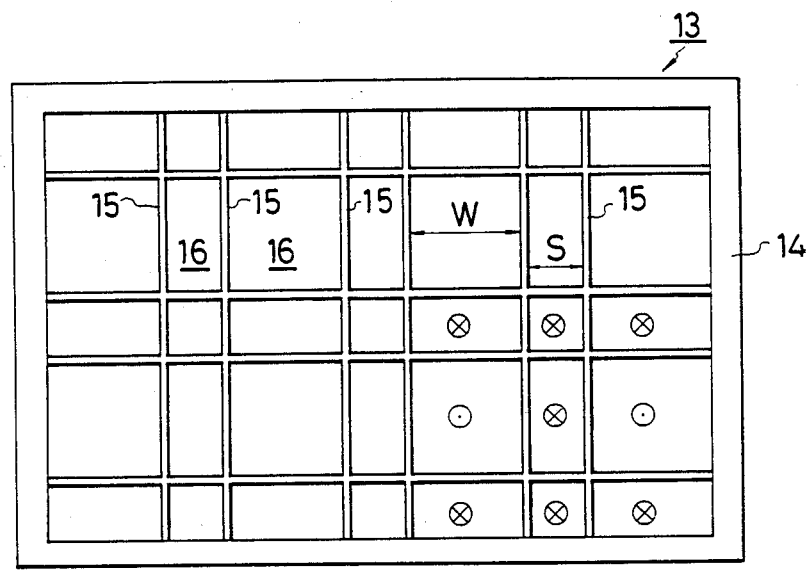
FIG. 3 is a plan view showing a perforate type electrode shown in FIG. 2.

FIGS. 2 and 3 illustrate a first embodiment of the jet generation device according to the present invention. In liquid 11, a perforate type electrode 13 is disposed at a predetermined interval from a plane electrode 12. In this embodiment, the perforate type electrode 13, as shown in FIG. 3, consists of a frame 14 of an insulating material and a plurality of wire-like electrode members 15 stretched in a form like a net on the frame 14 to define a plurality of space areas 16 and arranged such that they are spaced apart by the gaps to form alternate large and small perforate means or areas W and S. The frame 14 serves the roles of supporting the wire-like electrode members 15 and as a spacer to provide the distance between the perforate type electrode 13 and plane electrode 12.

Figure 4:
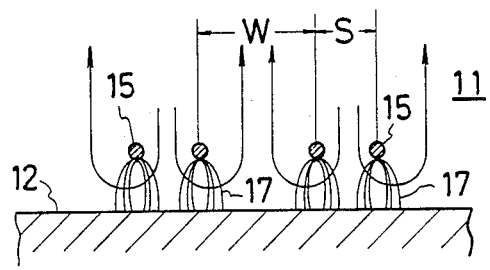
FIG. 4 is a view for explaining the state of electric lines of force when a voltage is applied between electrodes of the jet generation device according to the present invention.

When a high voltage is applied between the electrodes as noted above, an electric field is produced to generate electric lines 17 of force between the wire-like electrode members 15 of the perforate electrode 13 and plane electrode 12, as shown in FIG. 4. Considering the electric field intensity according to the surface of the plane electrode 12 the electric field in the small areas S between adjacent electrode members has higher intensity than that of the field in large areas W. When an electric field is produced in the liquid, the pressure thereof is increased by $(\frac{1}{2})\epsilon E^2$ (where $\epsilon$ is the dielectric constant and $E$ is the electric field intensity). In other words, the electric field intensity is highest just under each wire-like electrode member 15, then in the small areas S between adjacent wire-like electrode members 15, and it is lowest in the large areas W between adjacent wire-like electrodes.

Consequently, the flow of liquid, as shown by arrows in FIGS. 3 and 4, is produced, which passes through the small areas S between adjacent wire-like electrode members toward the plane electrode 12. At the plane electrode, this flow is re-directed to become a jet flowing through the large areas W to the direction for from the plane electrode. In FIG. 2, the mark ⊙ denotes jets flowing from between electrode members, i.e. out of paper of the Figure, and the mark ⊗ denotes jets flowing in between electrode members, i.e. into paper of the Figure. More specifically, the pressure of the liquid in the small areas S where the electric field intensity is high becomes higher than the pressure of the liquid in the large areas W where the electric field intensity is low. The direction of the jet is determined by the pressure gradient. In the case of the small area S, the adjacent wire-like electrode members 15 are close to each other. Therefore, with the same voltage applied, the electric field intensity in the neighborhood of this area is higher than in the wide area W. The pressure of the liquid thus is increased to increase the pressure gradient, thus increasing the flow speed of the jet.

As the wire-like electrode member 15 constituting the perforate type electrode 13, a brass, copper or stainless steel wire may be used. The diameter of the wire is suitably 0.5 to 5 mm. The gap 16 of the small area S between adjacent electrode members is suitably 1 to 50 mm. The gap 16 of the large area W is suitably 1.25 to 20 times the gap of the small area. That is, the gap of the small area S is 0.05 to 0.8 time the gap of the large area W. The distance between the plane electrode 12 and perforate type electrode 13 is suitably 0.5 to 50 mm. When a voltage of 0.5 to 300 kV is applied between the electrodes constructed in the ranges noted above, it is possible to obtain effective jets from the large areas defined by the electrode members.

Figure 5:
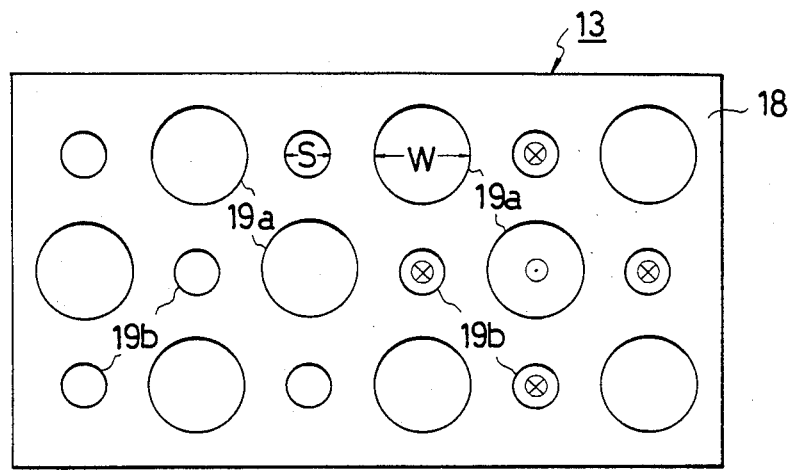
FIG. 5 is a plan view showing another embodiment of the perforate type electrode according to the present invention.

FIG. 5 shows a second embodiment of the perforate type electrode 13 of the jet generation device according to the present invention. The electrode consists of a perforated plate 18 having pluralities of alternately arranged large and small holes 19$a$ and 19$b$. The holes formed in the plate-like electrode 18 correspond to the gaps 16 in the embodiment of FIG. 3, that is, the large holes 19$a$ serve as large perforate means of areas W and the small holes 19$b$ as small perforate areas S. Since the large and small areas are arranged alternately, when a high voltage is applied between the perforate type electrode 13 having the above structure and plane electrode 12, the pressure of the liquid is highest under the hole-free portions of the plate electrode and lowest in the areas of the large holes 19$a$.

The holes in the plate-like electrode may be formed by punching. The holes need not be circular in shape, but they may be rectangular or ellipse-shaped instead. The holes are formed such that at least adjacent holes have different sizes. The equivalent diameter of the small hole is suitably 1 to 50 mm. As for the equivalent diameter of the large hole, the ratio S/W is suitably 0.05 to 0.8 as in the previous embodiment. The distance between the perforate type electrode and plane electrode is suitably 0.5 to 5 mm.

As the liquid for producing the jets may be used any liquid having an electric conductivity of $10^{-14}$ $\mho \cdot m^{-1}$ or above, e.g. ethyl alcohol, Freon 12, Freon 22, Freon 113, Freon 114, transformer oil.

Figure 6:
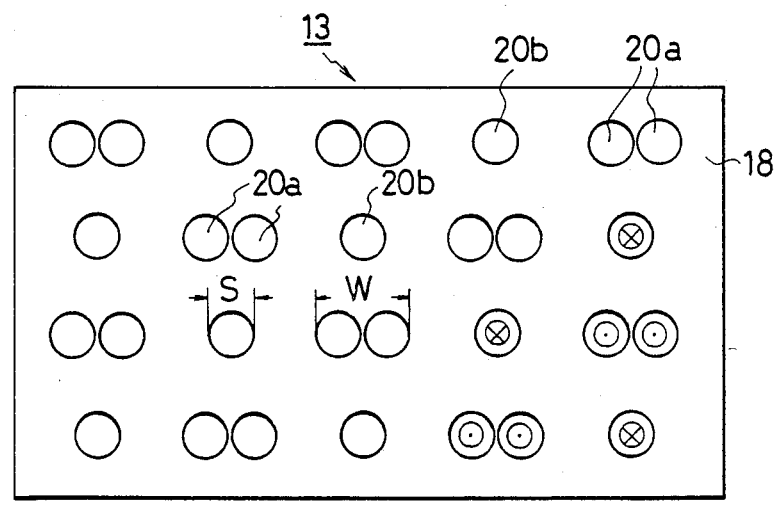
FIG. 6 is a plan view showing a further embodiment of the perforate type electrode according to the present invention.

FIG. 6 shows a third embodiment of the perforate type electrode 13 of the jet generation device according to the invention. This electrode consists of a plate-like electrode 18 having holes having the same diameter and arranged solely and as pairs alternately. When a high voltage is applied, each pair of holes 20$a$ formed adjacent to each other, serves as large perforate means of area W. In other words, the liquid pressure in this area becomes lower than that in the sole hole 20$b$. Thus, as in the previous examples, the liquid flows through the solely arranged holes into the space between the two electrodes and flows as jets through the hole pairs. The pair holes may be separated from each other or may be continuous with each other.

Figure 7:
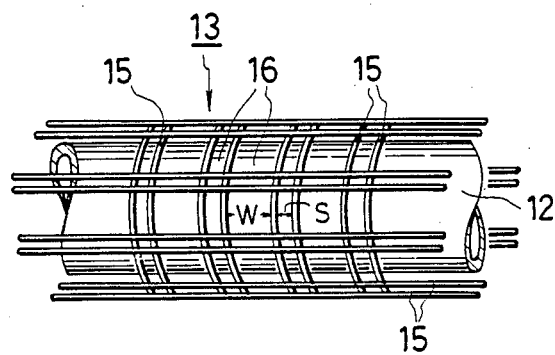
FIG. 7 is a view showing a perforate type electrode according to the present invention disposed such that it faces a pipe-like electrode.

In any of the above embodiments, the plane or solid electrode is a planar electrode. FIG. 7 shows an embodiment of the present invention applied to a heat exchanger. In this instance, a net-like perforate type electrode 13 is provided at a predetermined distance from a pipe-like plane (tubular electrode 12. That is, the outer periphery of the pipe-like electrode 12 which is disposed in liquid is surrounded by a cylindrical perforate type electrode 13 at a predetermined distance from the electrode 12. The perforate type electrode 13 consists of wire-like electrode members 15 stretched at non-uniform intervals such that large and small areas W and S are defined by the gaps 16 between adjacent wire-like electrode members 15. When a high voltage is applied between the plane electrode and perforate type electrode, the electric field intensity in the small areas S becomes larger than that in the large areas W, so that the liquid is caused to flow through the small areas toward the surface of the pipe-like electrode and flows as jets through the large areas. Consequently, effective heat exchange with the liquid can be obtained by the entire outer periphery of the pipe-like electrode. The net-like electrode in this embodiment may be replaced with a perforated electrode as shown in FIG. 5 or FIG. 6.

Now, examples of the invention will be described.

Figure 8:
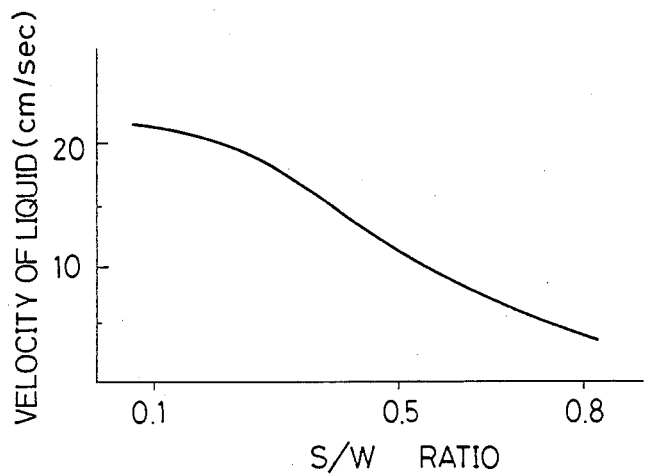
FIG. 8 is a graph showing the relation between the small-area-to-large-area ratio of perforate type electrode to the velocity of generated jets.

A perforate type electrode having the structure shown in FIG. 3 was disposed in a liquid mixture composed of 96% of "Freon 113" and 4% of ethanol at a distance of 2.0 mm from a plane electrode. As the wire-like electrode members of the perforate type electrode were used by using brass wires 1 mm in diameter. The gap of the small areas was set to 4.5 mm, and the gap of the large areas was set to be in the range of 5.6 mm (S/W=0.80) to 45 mm (S/W=0.1). A voltage of 20 kV was applied, and the relation between the ratio between the large and small areas and the maximum velocity of jets flowing out through the large areas was measured. FIG. 8 shows the results of measurements.

As is seen from the graph of FIG. 8, jets were produced with a S/W ratio in a range of 0.05 to 0.8. The smaller the value of S/W, the higher the velocity of the generated jets. Various experiments conducted by the inventors show that the velocity of jets increases substantially in proportion to the magnitude of the voltage applied between the electrodes.

The mechanism of the jet which is generated in the liquid in the manner as described above was studied quantatively and theoretically. Four wire-like electrode members made of brass and 2 mm in diameter were disposed in a liquid mixture composed of 96% of "Freon 113" and 4% of ethanol in two pairs spaced apart by 7 mm, the electrode members in the pair being spaced apart by 3 mm. The distance of these wire-like electrode members from the plane electrode was set to 2.0 mm. A voltage of 20 kV was applied between the electrodes, and a jet having a velocity distribution as shown in FIG. 9 was generated in a large area between electrode members of the two pairs.

Figure 9:
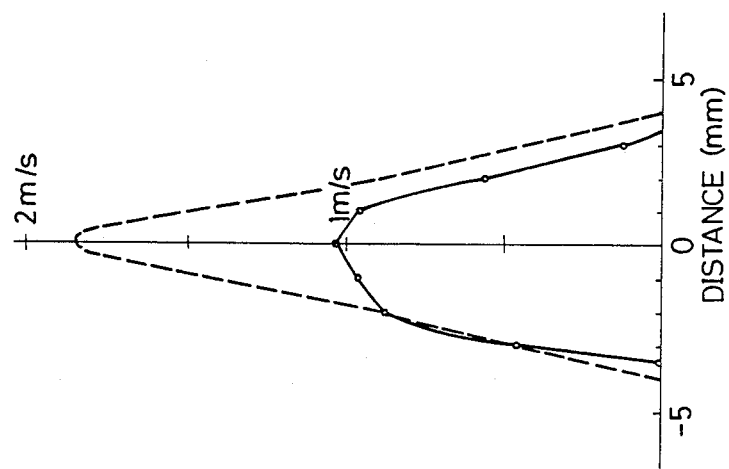
FIG. 9 is a graph showing a comparison of a jet velocity distribution obtained according to the present invention and results of theoretical calculations.

In FIG. 9, the ordinate is scaled for the jet velocity, and the abscissa is scaled for position. The graph shows that inner electrode members of the respective pairs are located at positions spaced apart by 3.5 mm from 0 in the opposite directions. A jet with a width of about 7 mm and having a velocity of 1 m/sec was detected.

The intensity E of the electric field is obtained from div E=0. The momentum conservation equation is expressed as:

$$\frac{\partial V_i}{\partial t} + V_j \frac{\partial V_i}{\partial x_j} = \nu \cdot \frac{\partial^2 V_i}{\partial x_j \cdot \partial x_j} + \frac{(\epsilon - \epsilon_o)(\epsilon + 2\epsilon_o)}{6\rho\epsilon_o} \cdot \frac{\partial E_j E_j}{\partial x_i}$$

wherein $V_i$ stands for the velocity in the i direction, t for the time, $x_i$ for the coordinate in the i direction, V for the dinamic velocity, $\rho$ for the density, $\epsilon$ for the permeability, $\epsilon_o$ for the permeability under the vacuum condition, and $E_i$ for the intensity of the electric field in the i direction.

The dotted line shown in FIG. 8 shows the results of analysis done under the assumption that the second term of the right-hand side of the equation represents a jet. From FIG. 9, it was quantitatively verified that experimental values substantially coincide with theoretical values and the jets are generated by the above mechanism.

Figure 10:
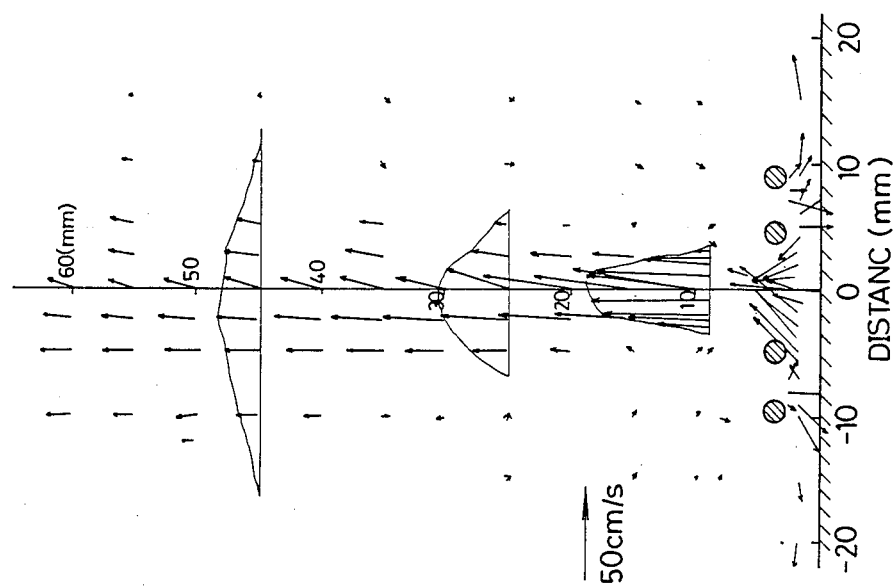
FIG. 10 is a view showing a jet velocity distribution obtained according to the present invention as measured with laser Doppler velocimeter (LDV).

FIG. 10 shows the velocity distribution obtained as a result of measurement of the jet shown in FIG. 9 with a laser Doppler velocimeter. It was confirmed that a jet is effectively generated in the gap of a large area between electrode members.

Figure 11:
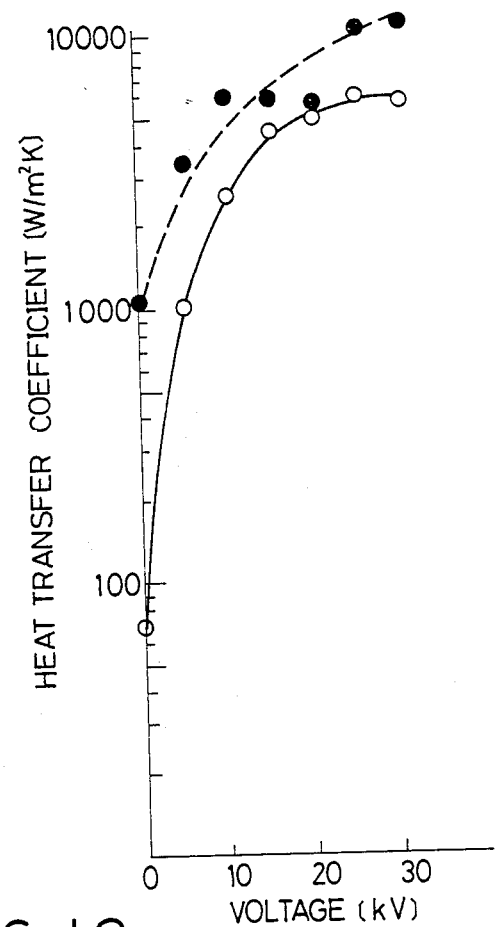
FIG. 11 is a graph showing the relation between heat transfer coefficient and applied voltage when the plane electrode is used as heat transfer surface.

Further, the effect of heat transfer was measured with the above measurement set-up by heating or cooling the plane electrode side and varying the voltage applied between the electrodes over a range of 0 to 30 kV. The results are as shown in the graph of FIG. 11. Mark o represents the heat transfer coefficient at the time of cooling, and mark ● the heat transfer coefficient at the time of heating. By applying a voltage of 5 kV, the heat transfer coefficient either at the time of cooling or heating is extremely improved with the generation of the jet in the liquid. In the case of cooling, the heat transfer is promoted to the neighborhood of 100 times with the application of a voltage of 20 kV. In the case of heating, the heat transfer coefficient is improved over 10 times with the application of a voltage of 25 kV.

Figure 12:
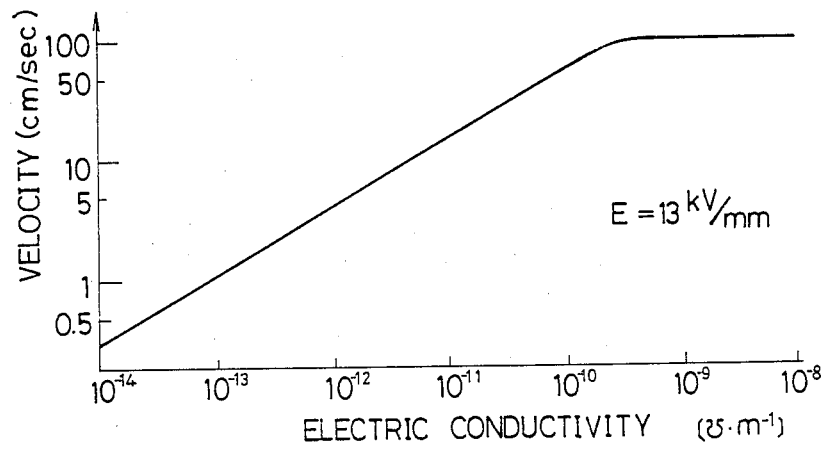
FIG. 12 is a graph showing the relation between the electric conductivity of the liquid used in accordance with the present invention and velocity of the generated jet.

FIG. 12 shows the results of measurement of the maximum velocity of the jet conducted in a liquid mixture composed of "Freon 113" and ethanol by varying the mixing ratio so that the electric conductivity of the liquid mixture fall in a range of $10^{+14}$ to $10^{-8}$ $\text{U m}^{-1}$.

As has been described in the foregoing, according to the invention no movable part is involved, and the heat transfer coefficient is improved to nearly 100 times in the case of cooling and to nearly 10 times in the case of heating. Thus, the invention can be applied to various fields.

One field of utility is in application in micro-gravity environments, more specifically application to liquid flow-generators, pumps and heat exchangers in space.

Particularly, the application to heat exchangers is not only effective in the micro-gravity environments as noted above, but when the invention is applied to earth-bound high performance heat exchangers, power generation heat exchangers, transformer coolers and other heat exchangers, it is possible to promote convective heat transfer and boiling heat transfer. In this case, the plane electrode surface may be used as the heat transfer surface, and the invention can be readily applied to the apparatus that has already been installed. Further, in the case of the boiling and evaporation heat transfer accompanying the generation of air bubbles, air bubbles held attached to the plane electrode are separated with the agitation and movement of the liquid itself due to generation of jets. This has an effect of greatly improving the coefficient of heat transfer at the plane electrode.

What is claimed is:

1. A device for generating jets in a liquid by applying a high voltage between a pair of electrodes disposed in the liquid at a predetermined distance from each other, said pair of electrodes being a plane electrode and a perforate type electrode having a plurality of large and small space areas arranged alternately, the pressure of the liquid in the large space areas being made lower than the pressure of the liquid in the small space areas, thereby causing jets to flow out from said large space areas.

2. The device for generating jets according to claim 1, wherein said perforate type electrode consists of a plurality of wire-like electrode members disposed such that large and small space areas are formed by gaps between adjacent wire-like electrode members.

3. The device for generating jets according to claim 2, wherein said wire-like electrode members of said perforate type electrode have a diameter ranging from 0.5 to 5 mm, the gap of the small space areas ranges from 1 to 50 mm, and the size ratio of the large space areas to the small space areas ranges from 0.05 to 0.8.

4. The device for generating jets according to claim 1, wherein said perforate type electrode is a plate-like electrode having alternately arranged large and small holes, said large holes constituting large space areas and said small holes constituting small space areas.

5. The device for generating jets according to claim 4, wherein the equivalent diameter of said small holes of said plate-like electrode ranges from 1 to 50 mm, and the size ratio of the equivalent diameter of said small holes ranges from 0.05 to 0.8

6. The device for generating jets according to claim 1, wherein said perforate type electrode is a plate-like electrode member with a plurality of holes having the same diameter, said holes being arranged alternately as single holes and pairs of holes.

7. A device for generating jets in a liquid, comprising:
a solid electrode having at least one surface in contact with a liquid having an electric conductivity;
a perforate electrode disposed at a predetermined distance from said solid electrode and having at least one surface in contact with said liquid, said solid and perforate electrodes being at different electrical potentials, said perforate electrode having alternating large perforate means and small perforate means, said large perforate means defining an area of perforation in said perforate electrode which is larger than that of said small perforate means, whereby a pressure of said liquid in said large perforate means is lower than that in said small perforate means, causing jets of said liquid to flow from said small perforate means to said large perforate means.

8. The device of claim 7 wherein said liquid has a conductivity of at least $10^{-4}$ $.m^{-1}$.

9. The device of claim 7 wherein said different electrical potentials are separated by at least 0.5 kV.

10. The device of claim 7 wherein a ratio of the area of perforation of said small perforate means to that of said large perforate means is 0.05 to 0.8.

11. The device of claim 7 wherein said perforate electrode comprises a plurality of wires crossing one another to define space areas therebetween, and wherein said large and small perforate means comprise alternating large and small ones of said space areas.

12. The device of claim 7 wherein said perforate electrode comprises a plate having alternating large and small holes, and wherein said large and small perforate means comprise large and small ones of said holes, respectively.

13. The device of claim 7 wherein said perforate electrode comprises a plate having a plurality of holes having the same diameter, and wherein said small perforate means comprises one of said holes arranged singly and said large perforate means comprises at least two of said holes arranged together.

* * * * *